Dec. 2, 1952 W. H. ROSS 2,619,896
ROASTING FORK
Filed Nov. 2, 1951
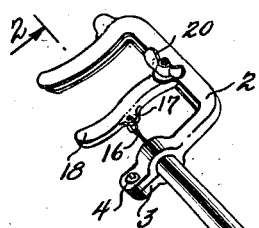
FIG. 1.
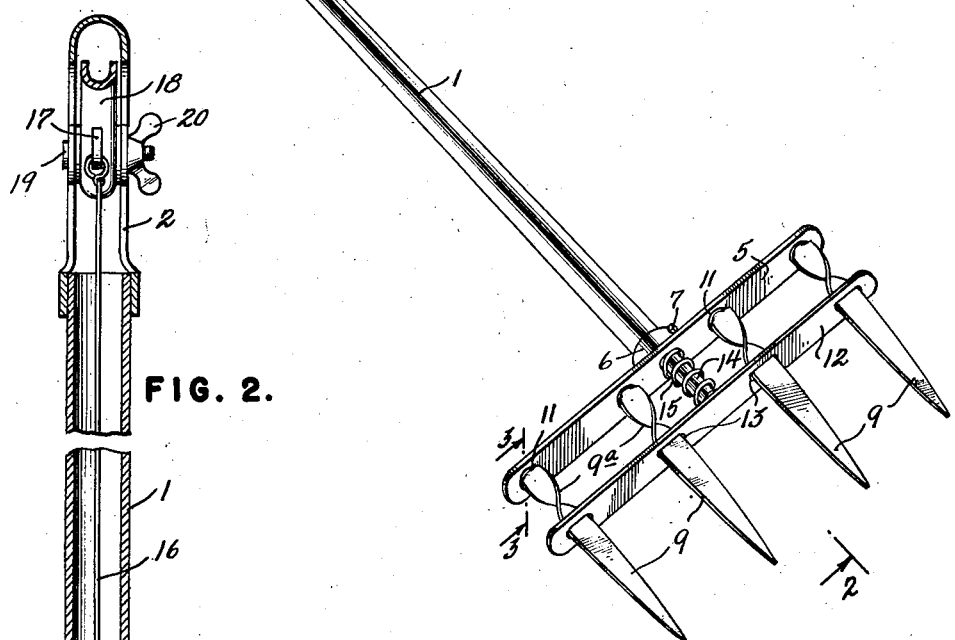
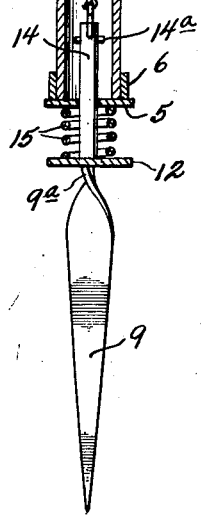
FIG. 2.
FIG. 3.
INVENTOR
WILLIAM H. ROSS
BY Stone, Boyden & Mack,
ATTORNEYS Patented Dec. 2, 1952

2,619,896

UNITED STATES PATENT OFFICE 2,619,896

ROASTING FORK

William H. Ross, Allentown, Pa.

Application November 2, 1951, Serial No. 254,557

4 Claims. (Cl. 99—421)

This invention relates to roasting forks, and more particularly to forks having tines which are individually rotatable about their longitudinal axes, so as to present different sides of the food to the fire.

The invention is designed especially for use in roasting wieners or frankfurters over a camp fire, as at picnics and the like.

An object of the invention is to devise improved means for simultaneously rotating a plurality of tines or prongs about their longitudinal axes, as the fork is held in the hand.

Another object is to provide a roasting fork having a simple and convenient mechanism for oscillating the individual tines operable by the same hand that holds the fork.

In order that the invention may be readily understood, reference is had to the accompanying drawings, forming part of this specification, and in which:

Fig. 1 is a perspective view of my improved roasting fork;

Fig. 2 is a longitudinal section on an enlarged scale substantially on the line 2—2 of Fig. 1 looking in the direction of the arrows; and Fig. 3 is a fragmentary section on a further enlarged scale substantially on the line 3—3 of Fig. 1.

Referring to the drawings in detail, my improved roasting fork comprises an elongated handle preferably in the nature of a hollow tube 1, to the upper end of which is secured a U-shaped hand grip 2. This is shown as having one of the arms split as at 3, so as to encircle the handle 1, being clamped to the handle by a screw 4.

Secured to the other end of the handle is a transversely extending bar 5. This may be attached to the handle by means of a ring 6, welded to the bar 5 and fastened to the handle by means of a set screw 7.

Journalled in the bar 5 are a plurality of tines or prongs 9. Each of these is formed with a rounded end or shank 8 which passes through an opening in the bar 5 and is secured in place as by means of a split washer 10, engaging a groove in the shank. A washer 11 may be employed on the opposite side of the bar 5 to give a more extended bearing to the shank 8.

A second bar 12 similar to the first is provided and is formed with a series of slots 13 through which the tines or prongs 9 freely pass. The bar 12 is rigidly secured to a rod 14 which passes through an opening in the bar 5 up into the hollow handle 1, as clearly shown in Fig. 2, and a coil spring 15 surrounds this rod and is interposed between the bars 5 and 12. A stop pin 14ª is carried by the rod 14 to limit the outward movement of the bar 12 under the influence of the spring 15.

A pull wire 16 is connected at one end to the rod 14 and extends up through the hollow handle 1, being connected at its upper end to an ear 17, secured to a finger lever 18, pivoted on a pin 19, carried by the hand grip 2 and secured by means of a nut 20. By tightening this nut, the frictional drag on the lever 18 may be adjusted as desired.

The tines or prongs 9 are shown as of relatively thin and flat shape, but, in any event, they are preferably of rectangular cross section and the slots 13 in the bar 12 are of the same shape. It will be seen that the bars 5 and 12 are disposed in spaced parallel relation, and each of the tines or prongs is given a twist of approximately 180°, as indicated at 9ª. As shown in Fig. 1, this twisted portion of the prongs normally lies at a point between the two bars 5 and 12.

In using the device, the operator grasps the hand grip 2 and the finger lever 18 in his hand and by exerting a squeezing action the lever 18 is swung upwardly on its pivot and, through the pull wire 16, moves the bar 12 up towards the bar 5, thus compressing the spring 15. During this movement of the bar 12 toward the bar 5, the slots 13 work over the tines or prongs, and, because of the twisted portion 9ª thereof, serve to impart to each of the tines a rotational movement about its own axis. Then, as the finger lever 18 is released, the spring 15 moves the bar 12 back away from the bar 5 and the tines or prongs are rotated in the opposite direction. Thus, as the bar 12 moves to and from the bar 5, the tines or prongs are simultaneously and individually oscillated about their longitudinal axes. In this way, any article of food impaled upon the tines or prongs will be turned back and forth so as to present different sides to the fire.

The exact shape or cross section of the prongs or tines is not important, the only essential thing being that the slots or openings in the bar 12 must be of a shape corresponding to that of the cross section of the prongs or tines, so that these slots or openings, working over the twisted portions will cause the prongs or tines to rotate.

What I claim is:

1. A roasting fork comprising a handle, a transversely extending bar rigidly secured to the end thereof, a second bar disposed parallel with and spaced from the first, said second bar having a series of slots therein, a plurality of tines journalled at one end in said first bar, and passing freely through the slots in said second bar, each of said tines being of a cross-section similar in shape to that of said slots and being twisted at a point normally lying between said bars, and means for moving said second bar toward and away from said first bar, whereby said tines are simultaneously oscillated about their longitudinal axes.

2. A roasting fork comprising a handle, a transversely extending bar rigidly secured to the end thereof, a second bar disposed parallel with and spaced from the first, said second bar having a series of rectangular slots therein, a plurality of tines journalled at one end in said first bar, and passing freely through the slots in said second bar, each of said tines being of rectangular cross-section, similar to that of said slots and being twisted through approximately 180° at a point normally lying between said bars, and means for moving said second bar toward and away from said first bar, whereby said tines are simultaneously oscillated about their longitudinal axes.

3. A roasting fork comprising a hollow handle, a transversely extending bar rigidly secured to the end thereof, a second bar disposed parallel with and spaced from the first, said second bar having a series of slots therein, a plurality of tines journalled at one end in said first bar, and passing freely through the slots in said second bar, each of said tines being of a cross-section similar in shape to that of said slots and being twisted at a point normally lying between said bars, a coil spring interposed between said bars, a pull wire secured at one end to said second bar and extending up through said first bar and through said hollow handle, and a finger lever pivotally mounted on said handle, to which lever the other end of said pull wire is attached, whereby, when said lever is swung on its pivot said second bar will be moved toward the first, compressing said spring, and when said lever is released, said spring will move said second bar away, thus oscillating said tines about their longitudinal axes.

4. A roasting fork comprising a hollow handle, a transversely extending bar rigidly secured to the end thereof, a second bar disposed parallel with and spaced from the first, said second bar having a series of slots therein, a plurality of tines journalled at one end in said first bar, and passing freely through the slots in said second bar, each of said tines being of a cross-section similar in shape to that of said slots and being twisted at a point normally lying between said bars, a coil spring interposed between said bars, a pull wire secured at one end to said second bar and extending up through said first bar and through said hollow handle, a U-shaped hand grip having one arm secured to said hollow handle, and a finger lever pivotally mounted on said hand grip at a point between the arms thereof, to which lever the other end of said pull wire is attached, whereby said lever may be swung on its pivot by simultaneously grasping it and the free arm of said hand grip, and when so swung, said second bar will be moved toward the first, compressing said spring, and when said lever is re-released, said spring will move said second bar away, thus oscillating said tines about their longitudinal axes.

WILLIAM H. ROSS.

REFERENCES CITED

The following references are of record in the file of this patent:

UNITED STATES PATENTS

| Number | Name | Date |
| --- | --- | --- |
| 270,277 | Brookes | Jan. 9, 1883 |
| 427,473 | Hauck | May 6, 1890 |
| 2,315,143 | Thompson | Mar. 30, 1943 |
| 2,420,710 | Livingston | May 20, 1947 |

FOREIGN PATENTS

| Number | Country | Date |
| --- | --- | --- |
| 840,856 | France | May 5, 1939 |